US006047078A

United States Patent [19]
Kang

[11] Patent Number: 6,047,078
[45] Date of Patent: Apr. 4, 2000

[54] METHOD FOR EXTRACTING A THREE-DIMENSIONAL MODEL USING APPEARANCE-BASED CONSTRAINED STRUCTURE FROM MOTION

[75] Inventor: Sing Bing Kang, Cambridge, Mass.

[73] Assignee: Digital Equipment Corporation, Houston, Tex.

[21] Appl. No.: 08/943,774

[22] Filed: Oct. 3, 1997

[51] Int. Cl.$^7$ ................................................. G06K 9/00
[52] U.S. Cl. .................................... 382/107; 382/154
[58] Field of Search .............................. 382/107, 118, 382/154, 236, 294, 238; 345/419; 348/409, 415

[56] References Cited

U.S. PATENT DOCUMENTS

| | | | |
|---|---|---|---|
| 5,490,221 | 2/1996 | Ransford et al. ................ | 382/130 |
| 5,657,426 | 8/1997 | Waters et al. ................... | 395/2.85 |
| 5,748,199 | 5/1998 | Palm ................................. | 345/473 |
| 5,802,220 | 9/1998 | Black et al. .................... | 382/276 |
| 5,818,959 | 10/1998 | Webb et al. ..................... | 382/154 |
| 5,852,669 | 12/1998 | Eleftheriadis et al. .......... | 382/118 |

OTHER PUBLICATIONS

Jiang Yu Zheng; "Acquiring 3–D Models from Sequences of Contours"; *IEEE Transactions on Pattern Analysis and Machine Intelligence*; vol., 16, No. 2; pp. 163–178; Feb. 1994.

Szeliski et al.; "Recovering 3D Shape and Motion from Image Streams Using Nonlinear Least Squares"; *Journal of Visual Communication and Image Representation*; vol. 5, No. 1; pp. 10–28; Mar. 1994.

R. Szeliski et al.; "Hierarchical Spline–Based Image Registration"; *Proc. Conf. On Computer Vision and Pattern Registration;;* pp. 194–210; Jun. 1994.

Kang et al.; "Automatic approach to mapping a lifelike 2.5D human face"; *Image and Vision Computing;* vol. 12 No. 1; pp. 5–14; Jan./Feb. 1994.

Jebara et al.; "Parametrized Structure from Motion for 3D Adaptive Feedback Tracking of Faces"; *Proc. Conf. On Computer Vision and Pattern Registration;* pp. 144–150; Jun. 1997.

Yin et al.; "Constructing a 3D individualized head model from two orthogonal views"; *The Visual Computer;* vol. 12, No. 5; pp. 254–266; 1996.

Akimoto et al.; "Automatic Creation of 3D Facial Models"; *IEEE Computer Graphics & Applications;* pp. 16–22; Sep. 1993.

*Primary Examiner*—Andrew W. Johns
*Attorney, Agent, or Firm*—Hamilton, Brook, Smith & Reynolds, P.C.

[57] ABSTRACT

In a computerized method, a three-dimensional model is extracted from a sequence of images that includes a reference image. Each image in the sequence is registered with the reference image to determine image features. The image features are used to recover structure and motion parameters using geometric constraints in the form of a wireframe mode. A predicted appearance is generated for each image using the recovered structure and motion parameters, and each predicted appearance is registered with the corresponding image. The recovering, generating, and registering steps are repeated until the average pixel value difference (color or intensity) between the predicted appearances and the corresponding images is less than a predetermined threshold.

8 Claims, 4 Drawing Sheets

METHOD FOR EXTRACTING A THREE-DIMENSIONAL MODEL USING APPEARANCE-BASED CONSTRAINED STRUCTURE FROM MOTION

FIELD OF THE INVENTION

This invention relates generally to computer vision, and more particularly to recovering structure from motion as expressed by optical flow in a sequence of images.

BACKGROUND OF THE INVENTION

In computer vision, one problem is to recover the three-dimensional shape of an object from a sequence of two-dimensional images acquired by a camera. This is especially difficult when both the camera parameters and point correspondences across the image sequence are unknown.

There is a large body of work on the recovery of raw 3-D data from multiple images; they include multibaseline stereo, trinocular stereo that combines constant brightness constraint with trilinear tensor, stereo with interpolation, and shape from rotation.

Virtually all stereo approaches assume a fixed disparity throughout once the disparity has been established, e.g., through a separate feature tracker or image registration technique. Most techniques assume that the camera parameters, intrinsic and extrinsic, are known. For 3-D facial modeling, the following techniques are generally known.

From Range Data:

Range acquisition equipment include light-stripe rangefinders, and laser rangefinders. Rangefinders, when compared to video cameras, are relatively expensive, and considerable post-processing is still required. For example in one method, feature-based matching for facial features, such as the nose, chin, ears, eyes, are applied to dense 3-D data to initialize an adaptable facial mesh. Subsequently, a dynamic model of facial tissue controlled by facial muscles is generated. In another method, a range image with a corresponding color image of a face is used. The 2-D color image is used to locate eyes, eyebrows, and mouth. Edges in color space are determined, and contour smoothing is achieved by dilation and shrinking.

From Two 2-D Images:

Two orthogonal views of a face are normally used. The profiles are extracted and analyzed; this is followed by facial feature extraction. A 3-D face template is then adjusted by interpolation, based on the extracted information.

From a Sequence of Temporally Related 2-D Images:

In one approach, 2-D images are used to reconstruct both shape and reflectance properties of surfaces from multiple images. The surface shape is initialized by conventional stereo image processing. An objective function uses the weighted sum of stereo, shading, and smoothness constraints. The combination of weights depends on local texture, favoring stereo for high texture with a known light source direction and known camera parameters.

A calibrated stereo pair of images has also been used. There, a disparity map is determined, followed by interpolation. In one implementation, three-dimensional deformation is guided by differential features that have high curvature values, for example, the nose, and eye orbits. If the motion between images in a sequence is small, then the optical flow can be used to move and deform a face model to track facial expressions. Fixed point correspondences are defined by the optical flow. The deformation of the face model is constrained and specific to faces. Facial anthropometric data are used to limit facial model deformations in initialization and during tracking with the camera's focal length approximately known.

In a different approach, facial features such as the eyes, nose and mouth are tracked using recursive Kalman filtering to estimate structure and motion. The filter output is used to deform the shape of the face subject to predefined constraints specified by a linear subspace of eigenvectors.

SUMMARY OF THE INVENTION

Provided is a computerized method for recovering 3-D models from a sequence of uncalibrated images with unknown point correspondences. To that end, tracking, structure from motion with geometric constraints, and use of deformable 3-D models are integrated in a single framework. The key to making the recovery method is the use of appearance-based model matching and refinement.

This appearance-based structure from motion approach is especially useful in recovering shapes of objects whose general structure is known but which may have little discernable texture in significant parts of their surfaces.

The method can be applied to 3-D face modeling from multiple images to create new 3-D faces for a synthetic talking head. The talking head includes a collection of 3-D triangular facets, with nodes as vertices. The model can be recovered even when the sequence of images are taken with a camera with unknown camera focal length and extrinsic parameters, i.e., the camera pose is unknown.

In the general method, a three-dimensional model is extracted from a sequence of images including a reference image. Each image in the sequence is registered with the reference image to determine image features. The image features are used to recover structure and motion parameters using geometric constraints on a 3D wireframe mesh template.

A predicted appearance is generated for each image using the recovered structure and motion parameters, and each predicted appearance is then registered with the corresponding image. The structure and motion recovery, appearance generation, and image registration steps are repeated until a selected termination condition is reached, for example, an average difference between the predicted appearances and the corresponding images is less than a predetermined threshold, or a fixed number of iterations has been performed.

DETAILED DESCRIPTION OF PREFERRED EMBODIMENTS

Introduction

Described is a computerized method for recovering 3-D models from a sequence of uncalibrated images with unknown point correspondences. In order to perform the recovery, the difficult point correspondence and occlusion problems must be overcome. To that end, tracking, structure from motion with geometric constraints, and use of deformable 3-D models are integrated in a single framework. The key which makes the method work is the use of appearance-based model matching and refinement.

This appearance-based structure from motion approach is especially useful in recovering shapes of objects whose general structure is known but which may have little discernable texture in significant parts of their surfaces. A good example of such an object is the human face, where there is usually a significant amount of relatively untextured regions, especially when there is little facial hair, and where the general facial structure is known. Also described below is an application of the method to 3-D face modeling from multiple images to generate a 3-D synthetic talking head.

The talking head model comprises a collection of 3-D triangular facets, with nodes as vertices. The recovery is performed from a sequence of images taken with a camera having mostly unknown intrinsic and extrinsic parameters.

In one embodiment, a frontal image of the head, i.e., the face, is used as a reference image. Line-of-sight constraints of 3-D facial nodes are imposed using the reference image. The 3-D model deformation is constrained by minimizing an objective function that trades-off minimal change in local curvature and node position with fit to predicted point correspondences and face appearance.

For general camera motion with constant intrinsic parameters, three views are theoretically sufficient to recover structure, camera motion, and all five camera intrinsic parameters. For stability reasons, only one unknown intrinsic camera parameter is assumed, namely the focal length. The aspect ratio is assumed to be unity, the image skew to be insignificant, and the principal point to be coincident with the center of the image.

System Overview

Figure 1:
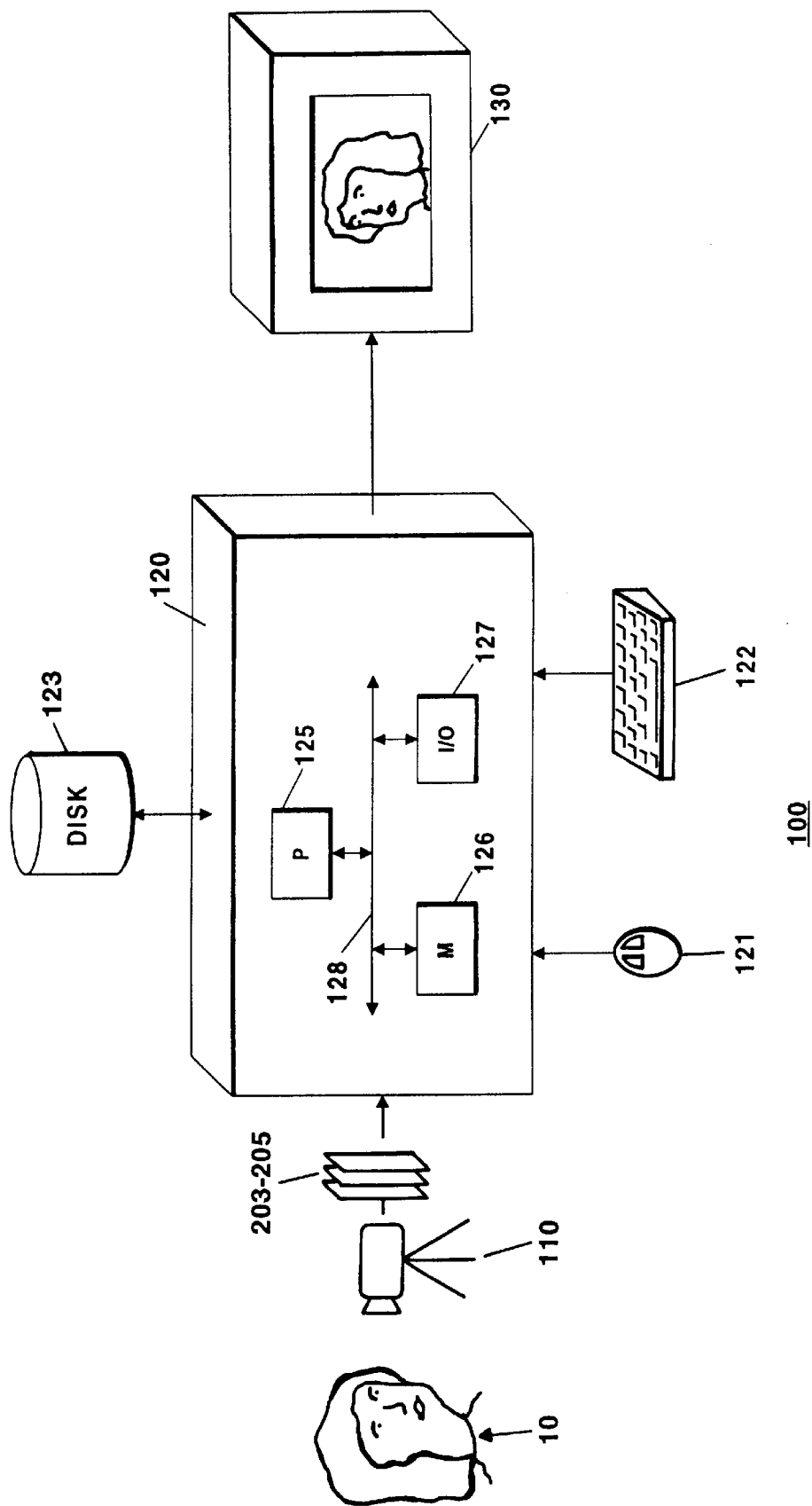
FIG. 1 is a block diagram of a 3-D structure recovery system that uses the invention.

FIG. 1 shows an arrangement 100 including a camera 110, an image processing system 120, and a monitor 130. The camera 110 can acquire a sequence of digital images 203–205 to be processed by the system 120. The sequence of images 203–205 can include various poses of an object, for example, a head 10. Although two images should be sufficient to perform some type of 3-D recovery, it is suggested that a minimum of three images are used when the shape to be recovered is a face. The poses measured by the camera 110 produce a reference frontal image, and left and right oblique views. An alternate arrangement is to have multiple cameras at predefined locations, each taking a snapshot of the same face from a different angle.

The system 120 can be a conventional computer system or workstation including input and output devices, for example, a mouse 121 and a keyboard 122. The system 120 includes one or more processors (P) 125, memories (M) 126, and input/output (I/O) 127 interfaces connected by a bus 128. The memories 126 store data and instructions that operate on the data. The data can be the digital images 203–205 of the sequence, or "frames" acquired by the camera 110. The system 120 can also be connected to a bulk storage device, for example, a disk 123.

General Operation

During operation, the system 120 uses an appearance-based structure from motion technique to recover a 3-D model from initially unknown point correspondences in the images, and an approximate 3-D template. The model can be displayed on the monitor 130. The template can be a "wire-frame mesh template" having a plurality of polygons, described in detail below.

Figure 2:
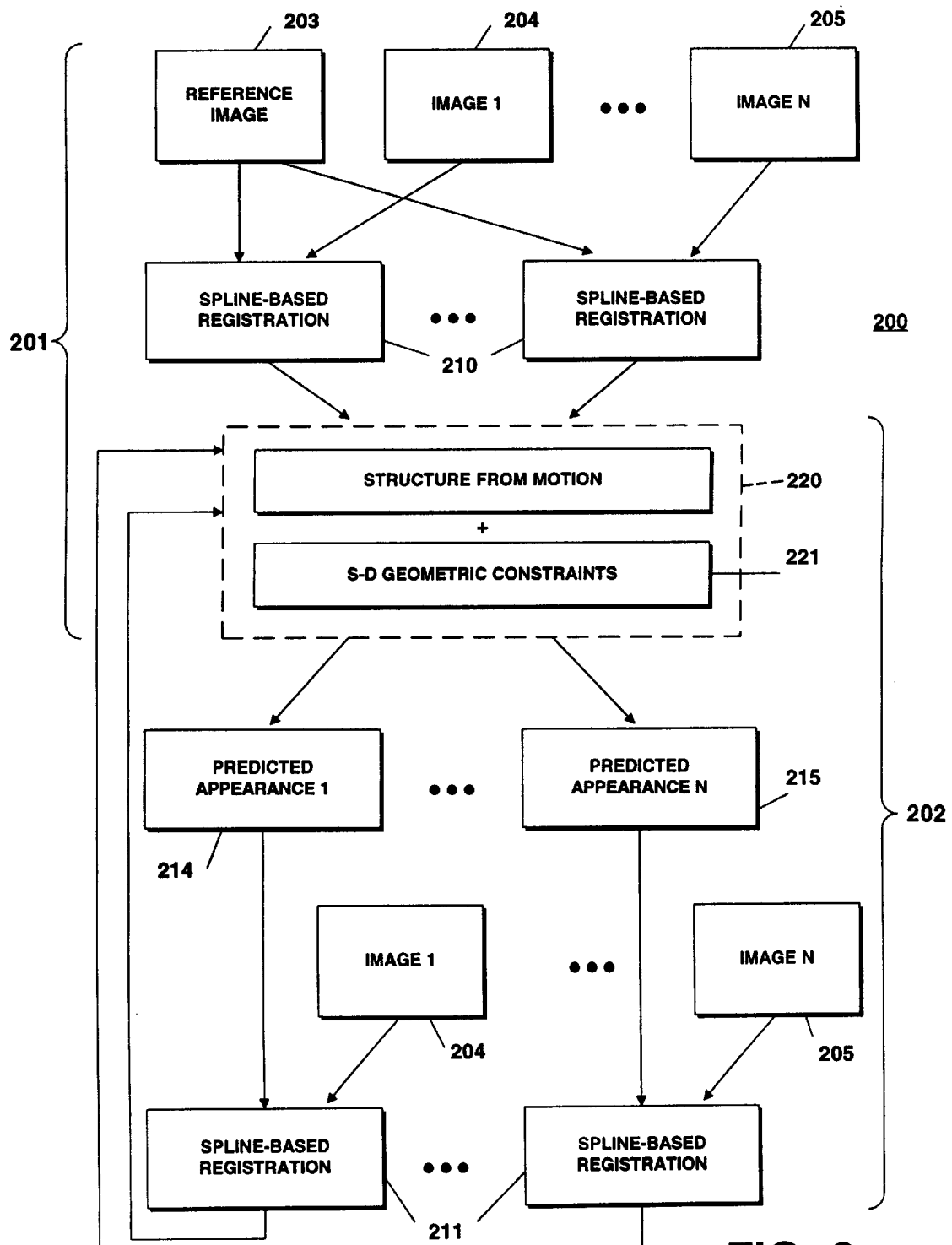
FIG. 2 is a flow diagram of a recovery method according to a preferred embodiment of the invention.

FIG. 2 shows a flow diagram of a general method 200 for recovering a 3-D structure according to the invention. The method 200 has an initialization phase 201, and a refinement loop 202. Image registration 210 is performed on images 203–205. Each image 204–205 is registered with a reference image 203. In the preferred embodiment, the image registration is spline-based as described in U.S. Pat. No. 5,611,00 issued to Szeliski on Mar. 11, 1997.

In step 220, structure motion and parameters are estimated using an iterative Levenberg-Marquardt batch approach. The appearance prediction is done using simple texture resampling. The predicted appearances 214–215 corresponding to each of the images 204–205 are based on current image point correspondences and structure from motion estimates. The predicted appearances can then be used to refine the image registration during the loop 202.

With the appearance-based structure from motion method according to the invention, initialization is first done by performing pair-wise spline-based image registration between the reference image and every other image in the sequence. In other words, the sequence of images 203–205 acquired by the camera 110 includes at least two images. Better results can be obtained with a sequence of a greater number of images.

The registration establishes a set of gross point correspondences for the image sequence. The camera parameters and model shape are extracted from the point correspondences. Subsequently, the method iterates over the following three major steps in the loop 202:

Appearance Prediction

In this step, for each image 204–205 other than the reference image, the appearance as constrained by the 3-D model 221, given the camera pose and intrinsic parameters, is determined and projected onto a new image (214–215), i.e., predicted appearances.

Spline-Based Image Registration

In step 211, each of the predicted appearances 214–215 is registered with the actual corresponding images 204–205 to refine the point correspondences. Here, the loop 202 can terminate when a predetermined termination condition is reached, for example, a fixed number of iterations, or the average difference between the images 204–205 and the predicted appearances 214–215 is less than some threshold.

Structure from Motion

Using the refined point correspondences, estimate the new, and usually better estimates of the camera pose and intrinsic parameters, as well as the 3-D model shape.

The use of appearance-based strategy is important because it accounts not only for occlusions, but also perspective distortion due to changes in the pose of the object being imaged. In contrast to prior art techniques which use edges, or specific object features, e.g., the eyes, nose, and mouth, the entire predicted images are used here.

Tracking by Spline-Based Registration

In the preferred spline-based registration framework, each new image $I_2$ (204–205) is registered to an initial reference image $I_1$ (203) using a sum of squared differences formulation (1):

$$E(u_i, v_i) = \sum_i [I_2(x_i + u_i, y_i + v_i) - I_1(x_i, y_i)]^2$$

where the $(u_i, v_i)$'s are estimates of optical flow on a per-pixel basis $(x_i, y_i)$.

Figure 3:
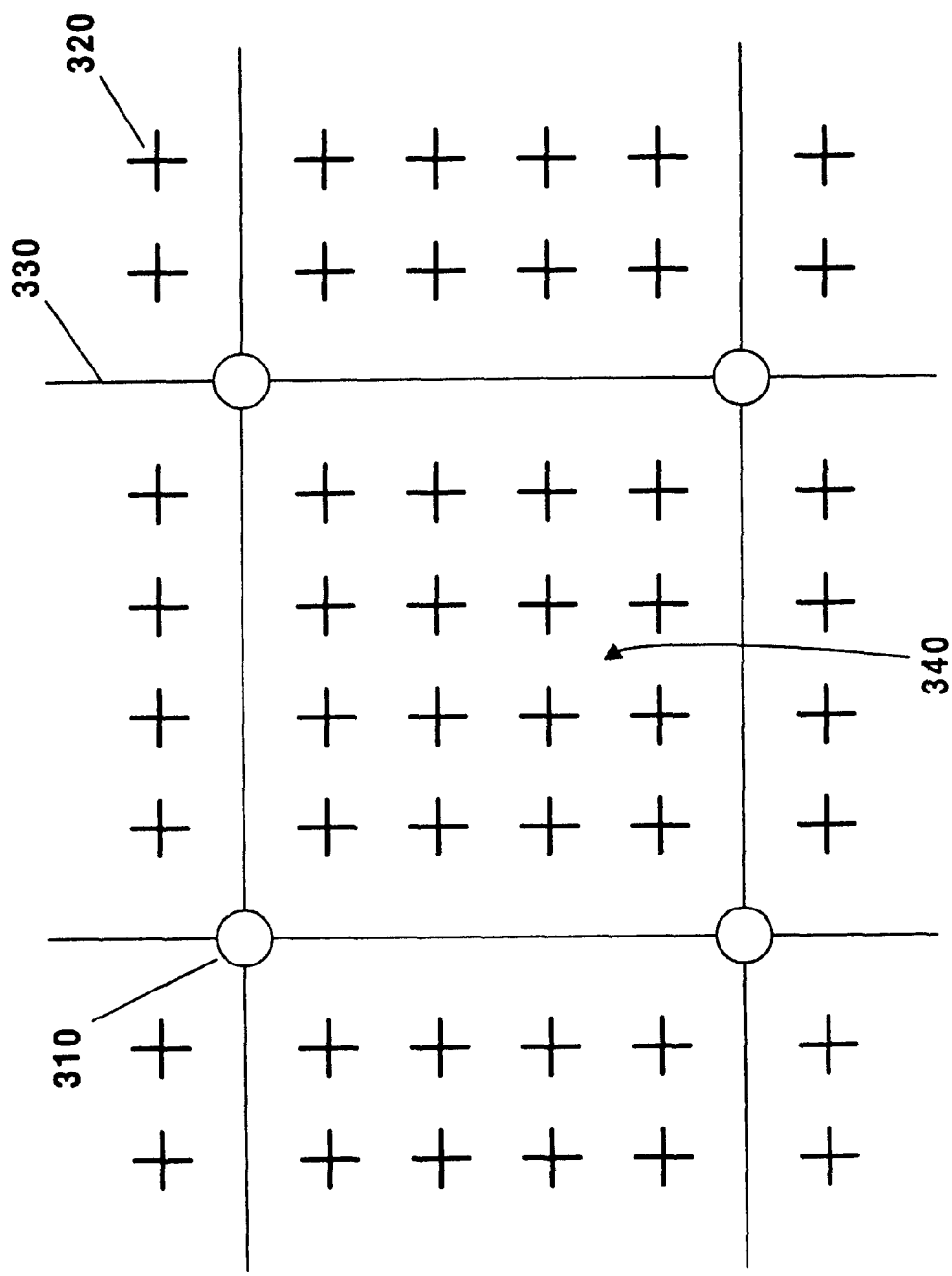
FIG. 3 is a diagram of spline control grid superimposed on pixel locations.

In FIG. 3, spline control vertices $(\hat{u}_j, \hat{v}_j)$ are shown as circles (o) 310, and the pixel displacements $(u_i, v_i)$ are shown as pluses (+) 320. In the preferred registration technique, the flow estimates $(u_i, v_i)$ are represented using two-dimensional splines that are controlled by a smaller number of displacement estimates $\hat{u}_j$ and $\hat{v}_j$ which lie on a coarse spline control grid 330. This is in contrast to representing displacements as completely independent quantities having an underconstrained problem. The value for the displacement at a pixel I can be written as (2):

$$\begin{pmatrix} u(x_i, y_i) \\ v(x_i, y_i) \end{pmatrix} = \sum_j B_j(x_i, y_i) \begin{pmatrix} \hat{u}_j \\ \hat{v}_j \end{pmatrix}$$

or $$\begin{pmatrix} u_i \\ v_i \end{pmatrix} = \sum_j w_{ij} \begin{pmatrix} \hat{u}_j \\ \hat{v}_j \end{pmatrix}$$

where the $B_j(x, y)$ are called the basis functions having non-zero over a small interval, i.e., there is finite support. The $w_{ij}=B_j(x_i, y_i)$ are called weights to emphasize that the displacements $(u_i, v_i)$ are known linear combinations of the control vertices $(\hat{u}_j, \hat{v}_j)$.

In the preferred implementation, the spline control grid 330 is a regular subsampling of the pixel grid, e.g., $\hat{x}_j=mx_i$, and $\hat{y}_j=my_i$. Thus, each set of m×m pixels corresponds to a single spline patch 340. The bilinear basis functions for the spline can be expressed as:

$$B_j(x,y)=\max((1-|x-\hat{x}_j|/m)(1-|y-\hat{y}_j|/m),0).$$

Other bases are possible. The local spline-based optical flow parameters are recovered using a variant of the Levenberg-Marquardt iterative non-linear minimization technique.

The spline-based equation (2) is modified to include the weights $m_{ij}$ associated with a mask as follows (3):

$$\begin{pmatrix} u_i \\ v_i \end{pmatrix} = \sum_j m_{ij} w_{ij} \begin{pmatrix} \hat{u}_j \\ \hat{v}_j \end{pmatrix}$$

where $m_{ij}=1$ or 0 depending on whether the corresponding pixel is in the object or background area respectively. This is necessary to prevent registration of the background areas influencing registration of the projected model areas across images. The value $m_{ij}$ can also be between 0 and 1, especially during a hierarchical search where the images are subsampled and the intensities are averaged.

General Structure from Motion

The step 220 of recovering structure essentially involves trying to recover a set of 3-D structure parameters pi and time-varying motion parameters $T_j$ from a set of observed image features $u_{ij}$. The general equation linking a 2-D image feature location $u_{ij}$ in frame j to its 3-D position $p_i$, is (4):

$$u_{ij}=P(T_j^{(k)} \ldots T_j^{(1)} p_i)$$

where i is the track index, and the perspective projection transformation $P(\ )$ is applied to a cascaded series of rigid transformation $T_j^{(k)}$. Each transformation is in turn defined by (5):

$$T_j^{(k)}x=R_j^{(k)}x+t_j^{(k)}$$

where $R^{(k)}$ is a rotation matrix and $t_j^{(k)}$ is a translation applied after the rotation. Within each of the cascaded time-varying when the j subscript are present, and fixed when the j subscript is dropped.

The general camera-centered perspective projection equation is (6):

$$\begin{pmatrix} u \\ v \end{pmatrix} = P_1 \begin{pmatrix} x \\ y \\ z \end{pmatrix} \equiv \begin{pmatrix} \frac{fx+\sigma y}{z} + u_0 \\ \frac{rfy}{z} + v_0 \end{pmatrix}$$

where f is a product of the focal length of the camera and the pixel array scale factor, r is the image aspect ratio, σ is the image skew, and $(u_0, v_0)$ is the principal point, i.e., the point where the optical axis of the camera 110 intersects the image plane. In theory, for general camera motion with constant intrinsic parameters, three views are sufficient to recover structure, camera motion, and all five camera intrinsic parameters. For stability, only one intrinsic camera parameters matter is considered, namely the focal length, the aspect ratio is assumed to be unity.

An alternative object-centered formulation can be expressed as (7):

$$\begin{pmatrix} u \\ v \end{pmatrix} = P_2 \begin{pmatrix} x \\ y \\ z \end{pmatrix} \equiv \begin{pmatrix} \frac{sx+\eta\sigma y}{1+\eta z} + u_0 \\ \frac{rsy}{1+\eta z} + v_0 \end{pmatrix} = \begin{pmatrix} \frac{sx}{1+\eta z} \\ \frac{rsy}{1+\eta x} \end{pmatrix}$$

with a reasonable assumption that σ=0 and $(u_0, v_0)=(0,0)$. Here, it is assumed that the (x, y, z) coordinates before projection are with respect to a reference frame that has been displaced away from the camera by a distance $t_z$ along the optical axis, with $s=f/t_z$ and $\eta=1/t_z$. It is possible to consider $t_z$ as the z component of the original global translation which is absorbed into the projection equation, and then set the third component of t to zero.

The projection parameter s can be interpreted as a scale factor and η as a perspective distortion factor. The alternative perspective formulation (7) results in a more robust recovery of camera parameters under weak perspective, where η>>1, and assuming $(u_0, v_0) \approx (0,0)$ and $\sigma \approx 0$, and $P(x, y, z)^T \approx (sx, rsy)^T$. This is because s and r can be much more reliably recovered than η, in comparison with formulation (6) where f and $t_z$ are highly correlated.

Least-Squares Minimization with Geometric Constraints

The Levenberg-Marquardt algorithm is used to solve for the structure and motion parameters. However, with geometric constraints the method minimizes (8):

$$\epsilon_{all}(a)=\epsilon_{sfm}(a)+\epsilon_{geom}(a)$$

where (9):

$$\varepsilon_{sfm}(a) = \sum_i \sum_j c_{ij}|u_{ij} - P(a_{ij})|^2$$

is the usual structure from motion objective function that minimizes deviation from observed point feature positions, and $P(\ )$ is given in (4) above, and (10):

$$a_{ij}=(p_i^T, m_j^T, m_g^T)^T$$

is the vector of structure and motion parameters which determine the image of point I in frame j. The vector a contains all of the unknown structure and motion parameters, including the 3-D points $p_i$, the time-dependent motion parameters $m_j$, and the global motion/calibration parameters $m_g$. The superscript T denotes a vector or matrix transpose. The weight $c_{ij}$ in (9) describes the confidence in measurement $u_{ij}$, and is normally set to the inverse variance $\sigma_{ij}^{-2}$. Here, the $c_{ij}$ can have a value proportional to the least amount of local texture indicated by the minimum eigenvalue of the local Hessian.

The local Hessian H is given by: (11)

$$H = \begin{bmatrix} \sum_w I_x^2 & \sum_w I_x I_y \\ \sum_w I_x I_y & \sum_w I_y^2 \end{bmatrix}$$

where w is the local window centered at (x, y) and $(I_x, I_y)$ is the intensity gradient at pixel (x, y). If $e_{min, ij}$ is the minimum eigenvalue at point I in frame j, then: (12)

$$c_{ij} = \frac{e_{min,ij}}{\max_{ij} e_{min,ij}}$$

This is particularly important in the case of recovery of a face model because of the possible lack of texture on parts of the face, such as the cheeks and forehead areas. Using this metric for $c_{ij}$ minimizes the importance of points on these relatively untextured areas. To account for occlusions, $c_{ij}$ is set to zero when the corresponding point is predicted to be hidden.

The other term in (8) is (13):

$$\varepsilon_{geom}(a) = \sum_i \left( \alpha_i |h_i - h_i^0|^2 + \beta_i |p_i - p_i^0|^2 \right),$$

which is the additional geometric constraints that reduces the deformation of the template or reference 3-D model. The quantities with the superscript 0 refer to the reference 3-D model that is to be deformed, $h_i$ is the perpendicular distance of point $p_i$ to the plane passing through its nearest neighbors, here three. In other words, $\Pi_i$ is the best fit plane of the neighbor points of $p_i$, and $p \cdot \hat{n}_i = d_i$ is the equation of $\Pi_i$, then (14):

$$h_i = p_i \cdot \hat{n}_i - d_i$$

$\alpha_i$ is the weight associated to the preservation of local height, i.e., to preserve curvature, and $\beta_i$ is the weight associated with the preservation of the reference 3-D position. The weights can be made to vary from node to node, or made constant across all nodes.

The Levenberg-Marquardt algorithm first forms the approximate Hessian matrix (15):

$$A = \sum_i \left[ \sum_j c_{ij} \left( \frac{\partial f(a)_{ij}}{\partial a} \right)^T \frac{\partial f(a)_{ij}}{\partial a} + B(\beta_i) \right]$$

where $B(\beta_i)$ is a matrix which is zero everywhere except at the diagonal entries corresponding to the ith 3-D point. The weighted gradient vector is (16):

$$b = \sum_i \left[ -\sum_j c_{ij} \left( \frac{\partial f(a_{ij})}{\partial a} \right)^T e_{ij} + g_i \right]$$

where $g_i = (0 \ldots p_i'^T \ldots 0)^T$, and (17):

$$p_i' = \alpha_i (h_i - h_i^0) \left( \frac{\partial h_i}{\partial p_i} \right)^T + \beta_i (p_i - p_i^0)$$
$$= \alpha_i (h_i - h_i^0) \hat{n}_i + \beta_i (p_i - p_i^0)$$

from (14) and using the simplifying assumption that each node position is independent of its neighbors, although this is not strictly true. Here, $e_{ij} = u_{ij} - f(a_{ij})$ is the image plane error of point I in frame j.

Given a current estimate of a, an increment δa towards the local minimum is determined by solving (18):

$$(A + \lambda I) \delta a = -b,$$

where λ is a stabilizing factor which varies over time. A line-of-sight constraint is also imposed on the recovered 3-D point with respect to the reference image.

Generating Predicted Appearance

It is relatively easy to render the model given the facets and vertices of a 3-D surface model, described in detail below, e.g., the 3-D geometric constraints 221 of FIG. 2. The object facets of the surface model are sorted in order of decreasing depth relative to the camera 110, and then rendered by texture-mapping the facets in the same decreasing depth order. The rendering technique can be any standard technique used in computer graphics.

A 3-D model that is a good candidate for our proposed approach is the human face model. Its structure is known and using conventional stereo techniques are not very reliable because the human face usually has significant portions of relatively untextured regions.

Mapping Faces to a 3-D Computer Generated Face

DECface is a system that facilitates the development of applications requiring a real-time lip-synchronized synthetic talking head, see U.S. Pat. No. 5,657,426, issued to Waters on Aug. 12, 1997.

DECface has been built with a simple interface protocol to support the development of face-related applications. The fundamental components of DECface are software speech synthesis, audio-file, and face modeling.

Of particular importance to the present invention is the face modeling component. It involves texture-mapping of frontal view face images, synthetic or real, onto a correctly-shaped wireframe.

Topologies for facial synthesis are typically generated from explicit 3-D polygons. For simplicity, a simple 2-D representation of the full frontal view is constructed because, for the most part, personal interactions occur face-to-face.

Figure 4:
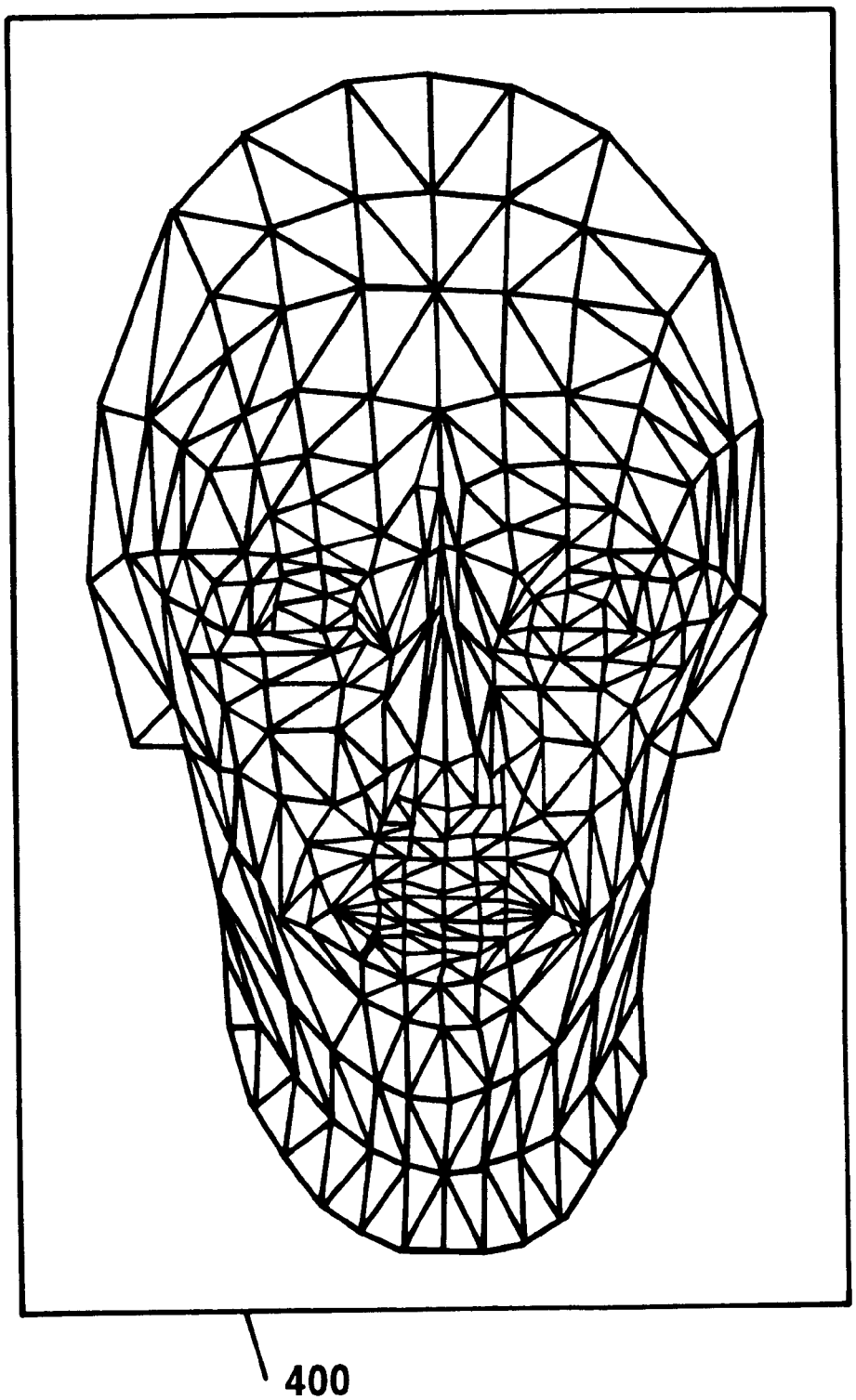
FIG. 4 is shows a facial wireframe model superimposed on an image of a face.

As shown in FIG. 4, a wireframe model 400 is superimposed on a facial image. The model 400 includes 200 polygons of which 50 represent the mouth and an additional 20 represent the teeth. The jaw nodes are moved vertically as a function of displacement of the corners of the mouth. The lower teeth are displaced along with the lower jaw. Eyelids are created from a double set of nodes describing the upper lid, such that as they move, the lids close.

The canonical representation is originally mapped onto the individual's image mostly by hand. This requires the careful placement of key nodes to certain locations, the corners of the lips and eyes, the placement of the chin and eyebrows, as well as the overall margins of the face.

Mapping Faces Using One Input Image

As mentioned in the previous section, mapping new faces to DECface involves texture-mapping frontal view face images (synthetic or real) onto a correctly-shaped wireframe. The original method to generate DECface with a new face is to manually adjust every node, which is a very tedious process. A "generic" separate face whose DECface topology and 3-D distribution is known is used as a reference during the process of moving each node within the new face image. This node-moving process is equivalent to the transfer of z information from the generic face to the new face. Methods to automate this process by using templates of facial features such as the eyes, mouth, and face profile have also been used. For a detailed description please see, U.S. patent application Ser. Nos. 08/815,981 "Facial image method and apparatus for semi-automatically mapping a face to a wireframe topology", filed Mar. 10, 1997 by Kang et al. and 08/870,480 "Automated Mapping of Facial Image to Wireframe Topology", filed Jun. 6, 1997, by Kang and Waters.

Because only one face input image is used, to generate the appropriate 3-D version of DECface, the canonical height distribution is preserved. This is, however, not always desirable, especially since many human faces have significantly different facial shapes. As a result, to preserve as much as possible the correct shape, we use three input images, each showing a different pose of the face, with one showing the frontal face pose. It is possible, of course, to use more than three images to achieve the same goal.

Mapping Faces Using Three Input Images

In the preferred embodiment, three images of a face at different orientations are used. An image of a frontal pose is used as the reference image. As before, the camera parameters, intrinsic and extrinsic, are generally not known. For simplicity, one can assume that the aspect ratio is one, the image skew is zero, and the principal point is at the image center. The point correspondences between the generic face and the reference face has been done as in described above. This is the same as assuming that the reference shape of the model has been initialized. Note, however, that the point correspondences across the image sequence are not known.

The values $\alpha_i$ and $\beta_i$ in (13) are set to 0.25. As mentioned above, the feature track fine-tuning step involves using the spline-based tracker on the predicted appearance and actual image. However, because the prediction does not involve the background, only the predicted face image portion of the image is involved; the weights associated with the background are set to zero in the spline-based tracker.

The method may fail when the change in the appearance of the object is too drastic from one frame to another in a sequence. In an 3-D face modeling application, rotations of up to about 15° between images are well tolerated.

A variant of the method would involve the direct incorporation of the optic flow term into the objective function (8) to yield (19):

$$\epsilon_{all}(a) = \epsilon_{sfm}(a) + \epsilon_{geom}(a) + \epsilon_{flow}(u)$$

where (20):

$$\varepsilon_{flow}(u) = \sum_i \sum_{j>1} \gamma_{ij} |I_1(u_{i1}) - I_j(u_{ij})|^2$$

with $I_j(u_{ij})$ being the intensity (or color) at $u_i$ on frame j, and $y_{ij}$ is the weight associated with the point $u_{ij}$. Note, that in this particular application of facial model recovery, the value of $u_{i1}$ is kept constant throughout because the first frame is the reference frame.

One problem with directly embedding this term in the structure from motion module is that the flow error term is local and thus unable to account for large motions. It would either require that the initial model pose be quite close to the true model pose, or the addition of a hierarchical scheme similar to that implemented in the spline-based registration method. Otherwise, the method is likely to have better convergence properties when the tracking is performed outside the structure from motion loop. In the present implementation, while having the small perturbations of the model pose would be desirable from the computational point of view, although not from the accuracy point of view, this is not a requirement.

In addition, using the flow error term directly may not be efficient from the computational point of view. This is because at every iteration and incremental step, a new predicted appearance has to be determined. This operation is rather computationally expensive, especially when the size of the projected model is large. Having the tracking module only loosely coupled with structure from motion results in fewer number of iterations in computing the predicted object appearance. Finally, there is the non-trivial question of assigning the weights $y_{ij}$ relative to the structure from motion and geometric constraint related weights.

Geometric constraints on the face deformation in other forms can also be used. An example would be to use the most dominant few deformation vectors based on Singular Value Decomposition (SVD) analysis of multiple training 3-D faces. A similar approach would be to apply nodal analysis on the multiple training 3-D faces to extract common and permissible deformations in terms of nonrigid modes.

SUMMARY

Described is an appearance-based structure from motion method that enables the direct extraction of 3-D models from a sequence of uncalibrated images. It is not necessary to precompute feature correspondences across the image sequence. The method dynamically determines the feature correspondences, estimates the structure and camera motion, and uses this information to predict the object appearance in order to refine the feature correspondences.

It is understood that the above-described embodiments are simply illustrative of the principles of the invention. Various other modifications and changes may be made by those skilled in the art which will embody the principles of the invention and fall within the spirit and scope thereof.

I claim:

1. A computerized method for extracting a three-dimensional model from a sequence of images of an object, comprising the steps of:
   (a) registering each image in the sequence with a reference image to determine image features;
   (b) recovering structure and motion parameters from the image features using geometric constraints;
   (c) generating a predicted appearance for each image using the recovered structure and motion parameters;
   (d) registering each predicted appearance with the corresponding image; and
repeating the recovering (b), generating (c) and registering (d) steps until a termination condition is reached.

2. The method of claim 1 wherein the registering is done using spline-based image registration.

3. The method of claim 1 wherein the geometric constraints are imposed directly on a 3-D wireframe model of the object.

4. The method of claim 1 wherein the object is a face.

5. The method of claim 1 wherein the sequence of images includes at least two images.

6. The method of claim 1 wherein the repeating terminates when an average pixel value difference between each predicted appearance and each corresponding image is less than a predetermined threshold.

7. The method of claim 1 wherein the sequence of images are provided by a camera and parameters of the camera are generally unknown.

8. The method of claim 3 wherein the wireframe model is composed of triangular facets.

* * * * *